US011116069B2

(12) United States Patent
Rao et al.

(10) Patent No.: US 11,116,069 B2
(45) Date of Patent: Sep. 7, 2021

(54) HIGH POWER DC NON TRANSFERRED STEAM PLASMA TORCH SYSTEM

(71) Applicant: Pyrogenesis Canada Inc., Montreal (CA)

(72) Inventors: Lakshminarayana Mydala Prahlada Rao, Bangalore (IN); Jocelyn Remillard, Blainville (CA); Pierre Carabin, Montreal (CA)

(73) Assignee: Pyrogenesis Canada Inc., Montreal (CA)

(*) Notice: Subject to any disclaimer, the term of this patent is extended or adjusted under 35 U.S.C. 154(b) by 92 days.

(21) Appl. No.: 16/225,963

(22) Filed: Dec. 19, 2018

(65) Prior Publication Data

US 2019/0306965 A1 Oct. 3, 2019

Related U.S. Application Data

(63) Continuation of application No. 14/768,090, filed as application No. PCT/CA2014/000108 on Feb. 17, 2014, now Pat. No. 10,178,750.

(60) Provisional application No. 61/765,518, filed on Feb. 15, 2013.

(51) Int. Cl.

| | |
|---|---|
| ***B23K 10/00*** | (2006.01) |
| ***H05H 1/42*** | (2006.01) |
| ***H05H 1/28*** | (2006.01) |
| ***H05H 1/34*** | (2006.01) |
| ***H05H 1/36*** | (2006.01) |

(52) U.S. Cl.

CPC ................ *H05H 1/42* (2013.01); *H05H 1/28* (2013.01); *H05H 1/34* (2013.01); *H05H 1/36* (2013.01); *H05H 2001/3426* (2013.01); *H05H 2001/3468* (2013.01)

(58) Field of Classification Search

CPC .. H05H 1/42; H05H 1/34; H05H 1/36; H05H 2201/3426; H05H 2201/3468

USPC ............ 219/121.49, 121.54, 121.48, 121.59, 219/121.52, 121.51

See application file for complete search history.

(56) References Cited

U.S. PATENT DOCUMENTS 5,247,152 A * 9/1993 Blankenship ............ H05H 1/34 219/121.49

6,153,852 A * 11/2000 Blutke .................... F23G 5/085 110/346

(Continued)

*Primary Examiner* — Mark H Paschall

(74) *Attorney, Agent, or Firm* — Benoit & Côté Inc.; Michel Sofia

(57) ABSTRACT

A high power DC steam plasma torch system (S) includes a steam plasma torch assembly (1) wherein superheated steam (46) is used as the main plasma forming gas, thereby resulting in a very reactive steam plasma plume. The superheated steam (46) is injected internally directly into the plasma plume via a ceramic lined steam feed tube (25) for reducing condensation of steam before reaching the plasma plume. The superheated steam (46) flows through a gas vortex (16) which has tangentially drilled holes thereby resulting in a high speed gas swirl that minimizes electrode erosion. In the present steam plasma torch system (S), the plasma torch assembly (1) is ignited using an ignition contactor which is housed external to the plasma torch assembly (1). The superheated steam (46) is injected into the plasma plume using a water cooled steam vortex generator assembly (15).

17 Claims, 2 Drawing Sheets

(56) References Cited

U.S. PATENT DOCUMENTS

| | | | | |
|---|---|---|---|---|
| 6,194,682 B1 * | 2/2001 | Schneider | B23K 10/00 | 219/121.48 |
| 8,395,074 B2 * | 3/2013 | Winn | B23K 9/1006 | 219/121.39 |
| 2014/0151343 A1 * | 6/2014 | Foret | H05H 1/34 | 219/121.5 |

* cited by examiner

HIGH POWER DC NON TRANSFERRED STEAM PLASMA TORCH SYSTEM

CROSS REFERENCE TO RELATED APPLICATIONS

This Application claims priority on U.S. Provisional Application No. 61/765,518, filed on Feb. 15, 2013, which is herein incorporated by reference.

FIELD

The present subject-matter relates to a plasma torch using steam as the main plasma forming gas.

INTRODUCTION

Plasma torches working with steam as the main plasma forming gas have many applications. Plasma torches which use steam as the main plasma forming gas produce a plasma plume with a high concentration of H+ and OH− ions. The steam plasma plume rich in these chemically very reactive species can be used in a wide range of applications starting from coal gasification to hazardous waste treatment [see references 1 to 4 detailed hereinbelow]. Steam plasma torches have been very successful in achieving difficult chemical conversion particularly for the destruction of chlorinated and/or fluorinated hydrocarbons [see references 5 to 7 detailed hereinbelow].

Steam plasma plume rich in H+ and OH− ions can only be achieved by internal injection of the steam in the plasma torch assembly, i.e. the injected steam should dissociate into H+ and OH− ions in the plasma plume becoming the main plasma forming gas. If steam is injected at the tip of the plasma torch, then the injected steam will undergo limited or zero dissociation, thereby producing a non-reactive plasma plume, which is evident by the poor destruction efficiency of such systems [see reference 8 detailed hereinbelow].

The existing plasma torches which use steam as the plasma forming gas have limitations, such as external steam injection, low gross power, higher electrode erosion and complex design with moving parts inside the plasma torch assembly [see references 9 to 11 detailed hereinbelow]. In most plasma torches, where steam is used as one of the plasma forming gases, steam is injected externally towards the exit of the plasma torches.

External steam injection results in a nonreactive steam plasma plume and/or a plasma plume which has very low concentration of H+ and OH− ions [see reference 11]. When steam is injected externally, the interaction of this externally injected steam with the main plasma plume will be limited and hence the injected steam will not reach higher temperatures necessary for the formation of reactive H+ and OH− ions [see reference 11]. This results in a plasma plume with low or zero concentration of H+ and OH− ions. Steam plasma with low concentration of reactive ions results in the loss of its ability to drive chemical reactions.

High power steam plasma torches are also unavailable for industrial applications. Currently available steam plasma torches are limited to lab-scale with a torch gross power of <50 kW [see references 12 and 13 detailed hereinbelow]. The medium power plasma torch systems, which are available, suffer from problems such as high electrode erosion; reported electrode lives are in the order of 50 hrs or lower [see reference 14 detailed hereinbelow]. Also, the medium power plasma torch systems have complex designs requiring moving components inside the plasma torch assembly, making them practically unsuitable for long term industrial applications [see reference 10].

Therefore, there is a need for a high power steam plasma torch systems with higher electrode life times while running on steam as the main plasma forming gas.

SUMMARY

It would thus be highly desirable to be provided with a novel steam plasma torch system.

Therefore, the embodiments described herein provide in one aspect a high power DC non transferred plasma torch system, comprising a plasma torch assembly housed for instance in a stainless steel housing, a cooling skid, a steam skid, a DC plasma power supply, a gas flow control cabinet, an ignition control cabinet, a control cabinet along with a programmable logic controller for the system, a torch ignition sequence, a torch control sequence and a human machine interface.

The embodiments described herein provide in another aspect a plasma torch system, comprising a plasma torch assembly, a cooling system for the plasma torch assembly, a steam system for the plasma torch assembly, a plasma power supply, a gas flow control system, and an ignition control system, and a controller for the plasma torch system.

The embodiments described herein provide in a further aspect a plasma torch assembly, comprising an electrode assembly for igniting the plasma torch assembly, a gas delivery system, a cooling system, and a steam delivery system adapted for injecting steam directly into the plasma plume.

BRIEF DESCRIPTION OF THE DRAWINGS

For a better understanding of the embodiments described herein and to show more clearly how they may be carried into effect, reference will now be made, by way of example only, to the accompanying drawings, which show at least one exemplary embodiment, and in which.

DESCRIPTION OF VARIOUS EMBODIMENTS

A vortex stabilized DC steam plasma torch system is herein described, which alleviates the shortcomings of other systems, such as:

- injecting steam directly in the plasma arc to have highly ionized gas rich in reactive H+ and OH− ions in the plasma plume (for effective reactions);
- use of button type cathode designs which do not require any moving parts and/or external high frequency energy sources for torch ignition, thereby resulting in a simpler design; and
- use of a button type cathode, tubular ignition electrode and tubular anode with steam injected in between the tubular ignition electrode and the tubular anode, which results in a feature that prevents bridging of the electrode The present steam plasma torch system provides:

- a steam plasma plume with a high degree of ionization of the injected steam, maximizing the formation of reactive H+ and OH− ions.
- a steam plasma torch which has an electrode life in the order of several hundreds of hours by alleviating the main reasons for high electrode erosion such as condensing steam on the electrodes. Superheated steam is used as the main plasma forming gas. The superheated steam is injected directly into the plasma plume via a short metallic tube. This design prevents or impedes the risk of condensation of steam before reaching the plasma plume and hence results in lower electrode erosion. In addition, the superheated steam flows through a gas vortex which can have tangentially drilled holes. This design results in a high speed gas swirl which minimizes electrode erosion. The present state of the art plasma torch designs uses either an electrode motion system or a high frequency pulse to ignite the plasma torch, i.e. the plasma torch electrodes are shorted and then separated with a motion system to ignite the arc, or a high frequency, high voltage, low current pulse is injected between the electrodes to create a plasma forming atmosphere. In the present system, the plasma torch is ignited using an ignition contactor which is housed external to the plasma torch assembly and does not require an electrode motion system.

Figure 1:
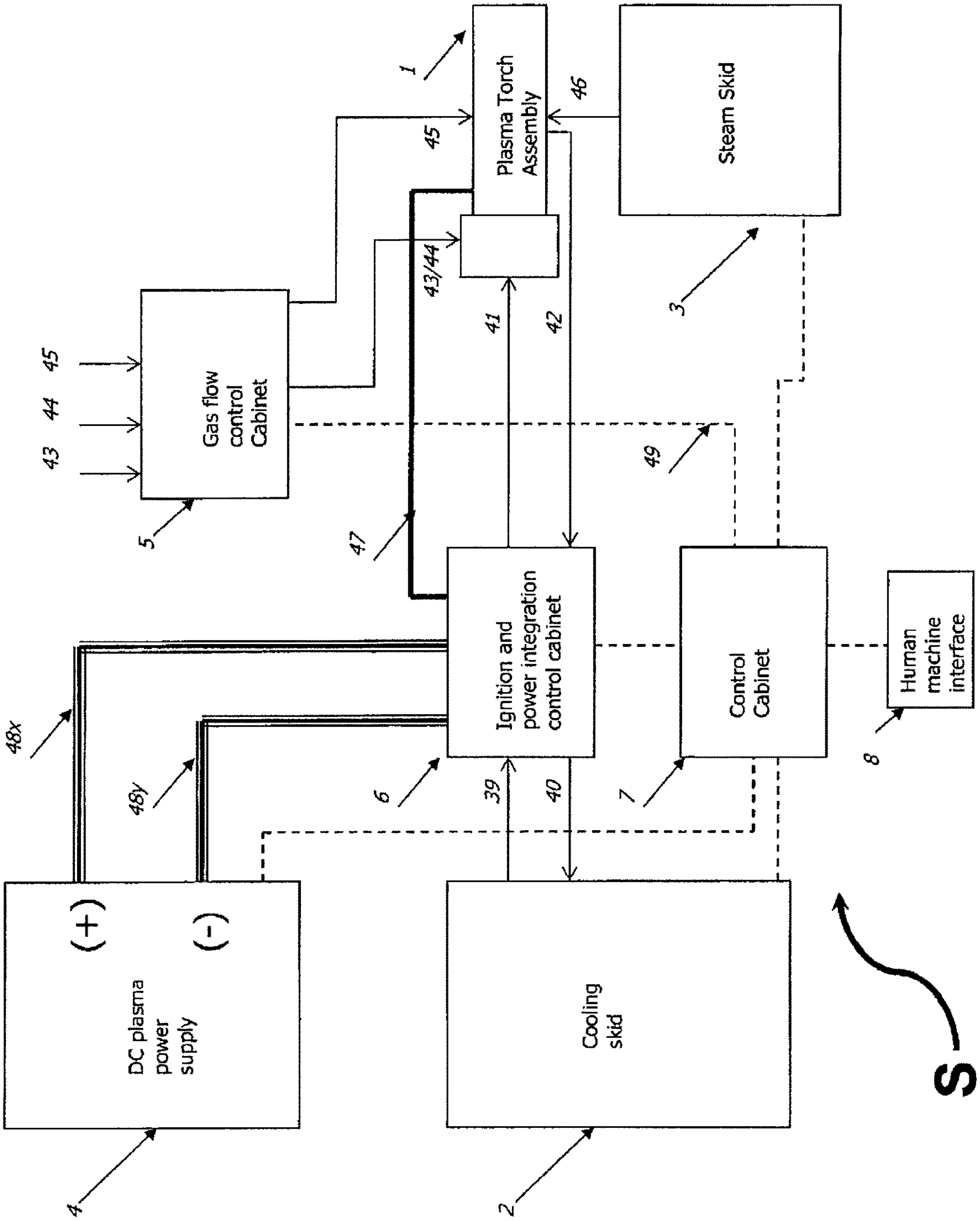
FIG. 1 is a schematic representation of a plasma torch system in accordance with an exemplary embodiment.

The present system is a high power DC plasma torch system which uses internally injected steam as the main plasma forming gas, thereby resulting in a very reactive steam plasma plume. In the present system, superheated steam is injected directly into the plasma plume using a water cooled vortex versus the current state of the art wherein steam is injected at the tip of the plasma torch. Also, in the present system, there are no moving components inside the plasma torch assembly such as those found in the state of the art technology which uses an electrode motion system to short the electrodes and separate the electrodes apart to ignite an electric arc As shown in FIG. 1, a plasma torch system S includes a plasma torch assembly 1, a cooling skid 2 which provides the necessary cooling to the plasma torch assembly 1, a steam skid 3 which supplies and controls the flow of superheated steam to the plasma torch assembly 1, an ignition and power integration control cabinet 6 which houses the torch ignition contactor and water-power manifolds, a DC plasma power supply 4 which provides DC power to the ignition and power integration control cabinet 6 through a positive cable 48*x* and negative cable 48*y*, a gas flow control cabinet 5 which controls the flow of ignition and shroud gases, a control cabinet 7 housing a programmable logic controller for the entire system, and a human machine interface 8, which provides an interface for the operator to communicate and control the entire system parameters, such as gas flow, steam flow, and torch power.

Figure 2:
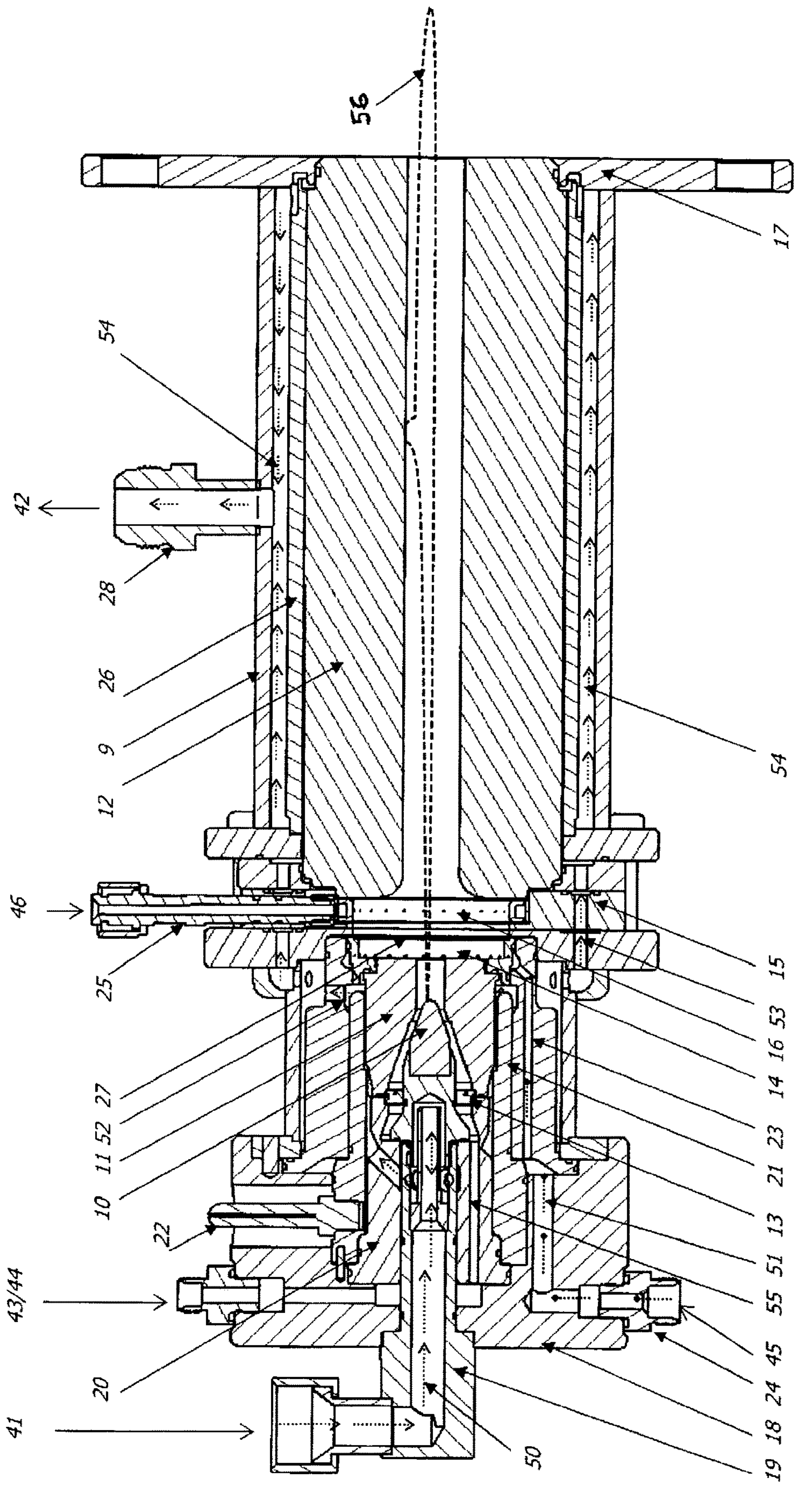
FIG. 2 is a cross sectional view of a plasma torch assembly of the plasma torch system.

As shown in FIG. 2, the plasma torch assembly 1 includes:

1. a stainless steel plasma torch housing 9, equipped with a mounting flange 17;

2. three torch electrodes namely, a conical cathode 10, machined from a rod of electron emitting material, such as hafnium or tungsten doped with rare earth oxides such as $La_2O_3$, $Y_2O_3$, $CeO_2$ $ZrO_2$, $ThO_2$, and MgO, this rod typically being embedded in vacuum cast copper, a tubular ignition electrode 11, typically machined from copper, and a tubular anode 12, typically machined from copper;

3. a shroud/ignition gas vortex generator 13 mounted between the rear cathode 10 and the ignition electrode 11, machined from high temperature ceramic such as Macor™, comprising tangentially drilled holes to create a gas shroud around the cathode 10;

4. an auxiliary gas vortex generator 14, mounted in front of the ignition electrode 11, machined from stainless steel, comprising tangentially drilled holes to create a gas vortex for the auxiliary plasma forming gas injected between the ignition electrode 11 and anode 12;

5. a water cooled steam vortex generator assembly 15 comprising a steam vortex generator 16, machined from stainless steel, comprising tangentially drilled holes to create a gas vortex for the steam plasma forming gas mounted in the back of the anode 12 and a water cooled stainless steel housing to hold the steam vortex generator 16 in its place; and 6. cooling water flow channels 50, 52, 53, 54 and gas flow channels 51 along the length of the plasma torch assembly 1.

The plasma torch housing 9 is for instance a single unit fabricated out of stainless steel and is equipped with a standard front mounting flange 17 to facilitate easy mounting of the torch assembly onto reactors/vessels equipped with standard flanged connecting ports.

The three torch electrodes 10, 11, 12 are co-axially mounted into the plasma torch housing 9 with a fixed gap between each electrode such that when assembled, the gap between the cathode 10 and the ignition electrode 11 is just sufficient to create a self-sustaining plasma forming condition during the ignition step of the ignition sequence. Similarly, the gap between the ignition electrode 11 and the anode 12 is just sufficient to transfer the arc from the ignition electrode 11 and the anode 12, without losing the plasma forming condition, during the transfer step of the torch ignition sequence.

The vortex generators 13, 14, 16 are fabricated and mounted co-axially to match their center lines with that of the electrodes, to create a tangential gas flow pattern for minimizing electrode erosion. The cooling channels 50, 52, 53 and 54, which are for example carved out either in a high temperature plastic housing or as an annulus between the electrode and the stainless steel housing, are fabricated to create a high velocity cooling flow circuit along the length of each electrode thereby avoiding or impeding film boiling conditions.

A cathode base 18 machined out for instance of a non-conducting high temperature polymer is mounted, e.g. with bolts, to the torch housing 9. A cathode holder 19 fabricated from a copper rod, is for instance thread-mounted into the cathode base 18. The conical cathode 10 is for example threaded into the cathode holder 19. The cathode holder 19 serves as a fluid conduit for the torch cooling water and also conducts DC power 41 to the plasma torch assembly 1.

A cathode manifold 20, fabricated for example out of a non-conducting high temperature polymer, is for instance threadably mounted around the cathode 10, and connects the cathode cooling channels 50 to the ignition electrode cooling channels 52.

Cooling water 39 supplied from the cooling skid 2, passes through a power manifold housed inside the ignition and power integration control cabinet 6. The DC cables 48*x* and 48*y* coming from the power supply 4 are also connected to the power manifolds. The power manifold mixes both the electric power and the cooling water and conveys both power and the cooling water to the plasma torch assembly 1 through power hoses 41 and 42. The power hoses 41 and 42 are made of flexible rubber with a copper wire as a central core. DC power flows through the central copper wire whereas the cooling water flows in the annular space of the power hoses 41 and 42.

The cooling water enters the plasma torch assembly 1 through the cathode holder 19, travels up to the back of the cathode 10, thereby providing the necessary cooling for the cathode 10, and flows out through the radial apertures of the cathode holder 19 via the cathode manifold 20 towards the ignition electrode 11.

Also, the cathode manifold 20 provides shroud/ignition gas flow channels 55 and conveys the shroud/ignition gas 43/44 to the vortex generator 13 that is for instance threaded around the cathode 10.

An ignition tube 21 fabricated out of any conductive metal, such as brass or copper, surrounds the cathode manifold 20 and connects an ignition plug 22 to the ignition electrode 11. An ignition cable 47 connects the ignition contactor housed in the control cabinet 6 and the ignition plug 22. The ignition electrode 11 is for instance threaded to front end of the ignition tube 21 and the ignition plug 22 is for instance threaded to the rear end of the ignition tube 21. The cooling water coming out of the cathode 10 travels along the length of the ignition tube 21 to reach the ignition electrode 11.

A shroud tube 23 fabricated out of high temperature polymer secures the ignition tube 21 in its place and a series of channels bored in the tube act as a fluid conduit for an auxiliary gas 45, such as argon, air, nitrogen, oxygen or similar. The auxiliary gas 45 injected through auxiliary gas ports 24 travels in the aperture of the shroud tube 23 to reach the auxiliary gas vortex generator 14.

The auxiliary gas vortex generator 14, which is for example fabricated out of stainless steel with tangential drilled holes to create a gas swirl to stabilize the arc column, is for instance threadably mounted onto the ignition electrode 11. The auxiliary gas 45 is injected during the torch ignition sequence. The auxiliary gas 45 provides the necessary driving force to transfer the arc from the ignition electrode 11 to the anode 12 during the ignition sequence.

The steam vortex generator assembly 15 comprises the stainless steel steam vortex generator 16 and a ceramic insulated steam feed tube 25, fabricated out of brass tube. The steam vortex generator 16 and the steam feed tube 25 are assembled into a water cooled body, fabricated out for instance of stainless steel, and is sandwiched between the auxiliary gas vortex 14 and the anode assembly 26. An insulating high temperature ceramic ring, such as a high alumina ceramic ring 27, placed between the auxiliary gas vortex 14 and the steam vortex generator assembly 15 provides electrical isolation between the ignition electrode 11 and the anode 12.

The cooling water leaving the ignition electrode 11 travels through the cooling channels 53 of the steam vortex generator assembly 15 for providing just sufficient cooling for the steam vortex generator assembly 15. The steam feed tube 25 is for example threadably mounted to the steam vortex generator 16 and a two-step design ensures that the steam feed tube 25 remains locked when assembled. Inlet superheated steam 46 flows through the ceramic insulated steam feed tube 25 to reach the steam vortex generator 16. The steam vortex generator assembly 15 is designed to minimize contact surfaces between the superheated steam 46 and the water cooled steam vortex generator assembly 15 in order to prevent steam condensation along its path before reaching the steam vortex generator 16.

The anode assembly 26 comprising the tubular anode 12, fabricated out of copper, and water cooling channels 54 around the anode 12, fabricated out of stainless steel, is for example bolted onto the torch housing 9. Silicon based O-rings are used to seal the water cooling channels 54 from leaks. The cooling water corning from the steam vortex generator assembly 15 flows through the cooling channels 54 of the anode 12 and provides the necessary cooling before exiting through a cooling water outlet port 28. The cooling water outlet port 28, which is fabricated out of electrically conducting material such as stainless steel, serves as a conduit to connect the cooling water return hose 42 and also conducts DC power to the anode 12.

The torch ignition and control program, which is installed in a programmable logic controller (PLC) housed inside the control cabinet 7, is used to ignite and control the plasma torch assembly 1 according to an operator input power set point. The human machine interface 8 communicates the operator input power set point to the PLC. The entire system is linked to the Human machine interface (HMI) 8 and to the PLC via a communication network cable 49.

The automatic ignition sequence when initiated starts the closed loop cooling skid 2 and ensures that there is sufficient cooling water flowing through the plasma torch assembly 1. The steam skid 3 is started and the steam lines conveying the steam to the plasma torch assembly 1 are heated to their operating conditions by circulating the generated superheated steam through these lines, which is discarded to the drain. The flow of the ignition gas 43, such as Helium or similar, and the flow of auxiliary gas 45 is started and controlled at its minimum set point using gas mass flow controllers installed in the gas flow control cabinet 5. The ignition contactor, positioned in the ignition control cabinet 6, is closed to short the anode 12 and the ignition electrode 11. The DC power supply 4 is started with a torch ignition current set point. The mechanical design of the plasma torch assembly 1, which ensures that self-sustaining plasma conditions exist in the presence of the ignition gas 43 between the electrodes, results in a plasma arc ignition between the ignition electrode 11 and the cathode 10. Upon ignition, the current set point is gradually increased and the flow of the auxiliary gas 45 is also ramped up. Once stabilized, the ignition gas 43 is switched from helium or similar to any inert shroud gas such as nitrogen or argon 44. The ignition contactor is opened to open the electrical contact between the ignition electrode 11 and the anode 12, thereby resulting in a transfer of the plasma arc attachment point from the ignition electrode 11 to the working anode 12. Once stabilized, the superheated steam flow 46 is gradually ramped up while gradually reducing the auxiliary gas flow 45 to zero. Once a stable steam plasma arc 56 exists between the electrodes, the ignition sequence goes to completion and the control is returned to the human machine interface 8 for operator control.

While the above description provides examples of the embodiments, it will be appreciated that some features and/or functions of the described embodiments are susceptible to modification without departing from the spirit and principles of operation of the described embodiments. Accordingly, what has been described above has been intended to be illustrative of the embodiments and non-limiting, and it will be understood by persons skilled in the art that other variants and modifications may be made without departing from the scope of the embodiments as defined in the claims appended hereto.

REFERENCES

1. Dummersdorf et al., U.S. Pat. No. 5,498,826
2. Hiroshi N. et Al., Vacuum, Vol. 73, 2004, p 589-p 593

3. Xinli Z et Al., Chem Comm, 2009, p 2908-p 2910
4. Xinli Z et Al., J. Phys. D : Appl. Phys. 44, 2011
5. Murphy A. B., et al., Plasma Chemistry and Plasma Processing, Vol. 22, No. 3, 2002
6. Narengerile et al., Plasma Chemistry and Plasma Processing, Vol. 30, 2010, p 813-p829
7. Kim Dong-yun et al., Surface and Coatings Technology, Vol. 202, 2008, p 5280-p 5283
8. Kim Soek-Wan et al., Vacuum, Vol. 70, 2003, p 59-p 66
9. Li et al., U.S. Pat. No. 252,537 A1
10. Severance J. R., et al., U.S. Pat. No. 007,320 A1
11. Watanabe T., AJChE, Vol. 5, No. 1, 2005, p 30-p 34
12. Glocker B., et al., Vacuum, Vol. 59, 2000, p 35-p 46
13. Watanabe T., et al., Thin Solid Films, Vol. 516, 2008, p 4391-p 4396
14. http://www.httcanada.com/arc.html

The invention claimed is:

1. A high power DC non transferred plasma torch system, comprising a plasma torch assembly housed in a housing, a cooling skid, a steam skid, a DC plasma power supply, a gas flow control cabinet, an ignition control cabinet, a control cabinet along with a programmable logic controller for the system, a torch ignition sequence, a torch control sequence and a human machine interface, wherein a water cooled vortex generator assembly with insulated superheated steam injection tubes is provided for injecting the superheated steam to a plasma plume.

2. A plasma torch system, comprising a plasma torch assembly, a cooling system for the plasma torch assembly, a steam system for the plasma torch assembly, a plasma power supply, a gas flow control system, and an ignition control system, and a controller for the plasma torch system, wherein a combination of the plasma power supply, an ignition contactor and a closely spaced cathode-ignition electrode assembly are used to ignite the plasma torch assembly.

3. The plasma torch system according to claim 2, wherein the ignition contactor is positioned outside of the plasma torch.

4. The plasma torch system according to claim 3, wherein the ignition control system includes the ignition contactor.

5. A plasma torch assembly, comprising an electrode assembly for igniting the plasma torch assembly, a gas delivery system adapted to feed gas to the electrode assembly, a cooling system adapted to cool the electrode assembly, and a steam delivery system adapted for injecting steam directly into a plasma plume, wherein the steam delivery system includes a steam vortex generator assembly for injecting the superheated steam into the plasma plume.

6. The plasma torch assembly according to claim 5, wherein the plasma torch assembly is adapted to operate with superheated steam.

7. The plasma torch assembly according to claim 5, wherein the steam vortex generator assembly includes insulated superheated steam injection tubes.

8. The plasma torch assembly according to claim 5, further including vortex generators to stabilize the steam plasma plume.

9. The plasma torch assembly according to claim 5, wherein the electrode assembly for igniting the plasma torch assembly includes a conical cathode, a tubular ignition electrode and a tubular anode.

10. The plasma torch assembly according to claim 9, further comprising a shroud/ignition gas vortex generator mounted between the conical cathode and the ignition electrode.

11. The plasma torch assembly according to claim 10, wherein the shroud/ignition gas vortex generator comprises tangentially drilled holes to create a gas shroud around the conical cathode.

12. The plasma torch assembly according to claim 9, further comprising a water cooled steam vortex generator assembly comprising a steam vortex generator, and wherein the steam vortex generator is mounted in the back of the tubular anode.

13. The plasma torch assembly according to claim 9, wherein the conical cathode is a button type cathode.

14. The plasma torch assembly according to claim 9, wherein steam is adapted to be injected between the tubular ignition electrode and the tubular anode.

15. The plasma torch assembly according to claim 9, wherein superheated steam is adapted to be injected directly into the plasma plume.

16. The plasma torch assembly according to claim 15, wherein the superheated steam is adapted to be injected directly into the plasma plume using a water cooled steam vortex generator assembly.

17. The plasma torch assembly according to claim 16, wherein the water cooled steam vortex generator assembly includes a steam vortex generator and a feed tube, wherein the inlet superheated steam flows through the feed tube to reach the steam vortex generator.

* * * * *